United States Patent
Karlik, Jr.

[11] 3,823,347
[45] July 9, 1974

[54] SOLID ELECTROLYTIC CAPACITOR

[75] Inventor: Steven Karlik, Jr., Palm Beach Gardens, Fla.

[73] Assignee: National Components Industries, Inc., West Palm Beach, Fla.

[22] Filed: Apr. 19, 1972

[21] Appl. No.: 245,520

[52] U.S. Cl. .............................................. 317/230
[51] Int. Cl. ........................ H01g 9/05, H01g 9/10
[58] Field of Search .................................... 317/230

[56] References Cited
UNITED STATES PATENTS
3,142,886   8/1964   Bronson et al. ............... 317/230 X
3,296,505   1/1967   Sparrow et al. ................. 317/230

OTHER PUBLICATIONS
Dalton, "Solder Glass Sealing," Journal of the American Ceramic Society, Vol. 39, No. 3, Mar. 1956, p. 111.
Snell, "Electrical Properties and Uses of Glass," The Glass Industry, Sept. 1962, p. 484.

Primary Examiner—Rudolph V. Rolinec
Assistant Examiner—William D. Larkins
Attorney, Agent, or Firm—Rudolph J. Jurick

[57] ABSTRACT

A solid electrolytic capacitor having a stem extending from a porous anode and carrying a semi-conductive layer deposited over a dielectric film. An inorganic mask is placed over the stem in the region where it emerges from the anode, which mask prevents creepage of the semi-conductive layer onto the stem and also, serves to strengthen the area where the stem emerges from the anode.

1 Claim, 2 Drawing Figures

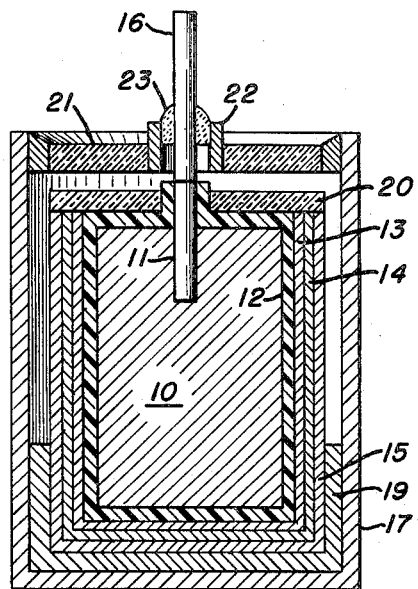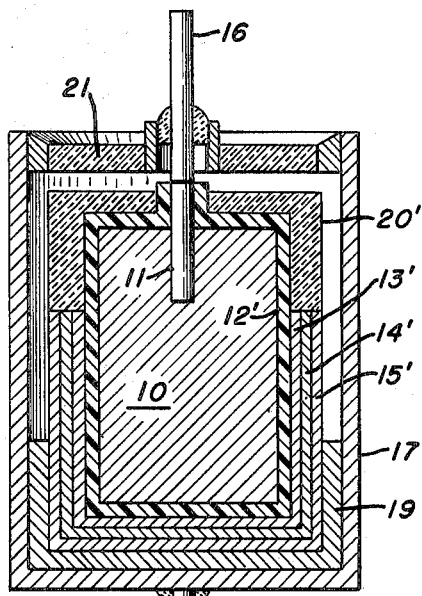

SOLID ELECTROLYTIC CAPACITOR

BACKGROUND OF THE INVENTION

In making a solid electrolytic capacitor a porous anode is formed of a compressed and sintered valve metal and includes a positive-polarity stem extending therefrom. A dielectric film is formed over the anode surface after which a semi-conductive dioxide layer is formed over the flim by pyrolysis. Normally, the semi-conductive layer creeps onto the stem, thereby increasing the leakage current of the capacitor. This creepage also necessitates making the stem, as well as the metal container in which the anode is encapsulated, of increased length, to prevent internal short-circuiting of the capacitor.

In accordance with this invention, an inorganic mask is disposed over the stem and the contiguous surface of the anode, which mask prevents creepage of the semi-conductive layer onto the stem, thereby providing a capacitor of maximum volumetric efficiency and minimum leakage current.

SUMMARY OF THE INVENTION

A porous anode made of compreseed and sintered valve metal particles, preferably tantalum, is formed to a desired shape and has a tantalum stem extending therefrom. A mask of devitrified glass is disposed over a surface of the anode and around the stem in the area where the stem emerges from the anode. By reason of its solid impervious nature, the mask prevents creepage of the semi-conductive manganese dioxide layer onto and along the stem during the pyrolytic process.

An object of this invention is the provision of a solid electrolytic capacitor of improved volumetric efficiency.

An object of this invention is the provision of a solid electrolytic capacitor comprising a valve metal anode having a stem extending therefrom, and a mask of inorganic material surrounding the stem in the area where the stem emerges from the anode.

An object of this invention is the provision of a solid electrolytic capacitor in which the positive-polarity stem extending from an anode has a shorter length than stems of similar capacitors heretofor available.

The above stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views:

FIG. 1 is a central cross-sectional view of a capacitor made in accordance with one embodiment of this invention; and FIG. 2 is a similar view showing a capacitor made in accordance with another embodiment of the invention.

DESCRIPTION OF PREFERRED EMBODIMENTS

Referring to FIG. 1, the capacitor anode 10 is formed of a film-forming metal, preferably tantalum powder, the powder being compressed and then sintered to form a porous cylinder. Imbedded in the anode is a tantalum stem 11. The anode is then suspended in a bath of liquid electrolyte containing an inert electrode. A current is then passed through the electrolyte, between the anode and the inert electrode, thereby resulting in the formation of a thin dielectric film 12 of tantalum oxide over the entire anode surface, including the internal surfaces of the pores. After washing, the anode is impregnated with a manganese nitrate solution which is converted, pyrolytically, to a solid semi-conductive manganese dioxide layer 13. A conductive coating 14 of carbon particles is then formed over the semi-conductive layer, such coating being formed by applying a colloidal suspension of graphite over the layer 13, followed by drying. The conductive coating 14 reduces the electrical resistance of the dioxide metal interface, thereby lowering the series resistance of the anode. Since carbon is not solderable, a silver coating 15 is applied over the carbon layer 14. A lead wire 16 is welded to the stem 11. A slug of solder is disposed in the can 17 having a lead wire 18 welded or staked thereto. After the can has been heated to the melting point of the solder, the anode is inserted into the can to a predetermined extent. Upon cooling, the solder forms a coating 19 which secures the anode to the case and, at the same time, provides a low resistance connection between the solder coating 15 and the can.

Normally, the anode coatings, particularly the manganese dioxide layer 13, creep part way up the stem 11, thereby increasing the internal leakage current of the capacitor. Such creepage also requires the use of a stem of extended length, thereby resulting in the welding of the lead wire 16 to the stem 11 at a substantial distance from the anode surface to prevent internal short-circuiting of the capacitor. The increased stem length necessitates the use of a case of increased length, thereby resulting in relatively low volumetric efficiency. In accordance with this invention, creepage of the anode coatings onto the stem is prevented by a devitrified glass mask 20 disposed around the stem at the junction where the stem emerges from the anode. Devitrified glass is glass which initially melts at a relatively low temperature and can be compounded to have various coefficients of contraction and expansion. Once the glass has been cooled it sets up in a crystalline form and will not remelt. The mask may be preformed from a lead silicate borate compound and inserted over the stem either prior to or after the formation of the dielectric film 12. Alternatively, the mask may be formed by spraying the compound onto the anode, or by dipping the anode into the compound, and then applying heat thereto. The thickness of the mask will depend upon its method of formation, a thickness of a few thousandths of an inch being practical in most instances. In any event, the anode coatings, formed pyrolytically or otherwise, will not creep up and over the mask because of its solid, impervious nature. The case is sealed by a glass to metal seal 21 including a metal sleeve 22, after which the lead wire 16 is soldered to the sleeve as indicated by the numeral 23.

As shown in FIG. 2, the devitrified glass mask 20' may have the configuration of a cup having a side wall surrounding the upper end portion of the anode. In this case, the semi-conductive dioxide layer 13', the carbon coating 14', and the silver coating 15' extend to the end wall of the mask.

In both embodiments of the invention, the thickness of the devitrified glass mask is considerably less than the excess stem length required to allow for a maximum creepage of the anode coatings in capacitors as made heretofore. This permits welding of the positive polarity lead wire to the stem at a point very close to the anode surface without degradation of electrical characteristics. Consequently, a capacitor of given capacity can be housed in a can of minimum length, or a can of given length can house a capacitor having an increased capacity, as compared to capacitors of conventional construction. Also, the devitrified glass mask provides structural support for the stem at the critical point, that is, where the stem emerges from the anode. At the same time, the devitrified glass mask results in an all inorganic structure, thereby eliminating by-products of organic decomposition which may be harmful to performance, life and reliability. Furthermore, the capacitor has an operating temperature capability higher than that of capacitors made by using other masking techniques, and the change in capacitance at elevated temperatures is predictable.

Having now described the invention, what I desire to protect by letters patent is set forth in the following claims.

I claim:

1. In a solid electrolytic capacitor having a stem extending from an end of an anode having a dielectric film formed on the entire surface thereof, the improvement comprising a relatively thin flat member made of devitrified glass and surrounding the stem in the region where it emerges from the anode, said member being in flush contact with the entire dielectric film formed on the said end of the anode.

* * * * *